United States Patent [19]

Ugon

[11] 4,295,041
[45] Oct. 13, 1981

[54] DEVICE FOR THE PROTECTION OF ACCESS TO A PERMANENT MEMORY OF A PORTABLE DATA CARRIER

[75] Inventor: Michel Ugon, Saint-Ouen, France

[73] Assignee: Compagnie Internationale pour l'Informatique CII-Honeywell Bull (Societe Anonyme), France

[21] Appl. No.: 137,973

[22] Filed: Apr. 7, 1980

Related U.S. Application Data

[63] Continuation-in-part of Ser. No. 936,694, Aug. 25, 1978, Pat. No. 4,211,919.

[30] Foreign Application Priority Data

Aug. 26, 1977 [FR] France .............................. 77 26107
Jul. 2, 1979 [FR] France .............................. 79 17171

[51] Int. Cl.³ ............................................. G06K 19/06
[52] U.S. Cl. .................................... 234/487; 235/488
[58] Field of Search ........................ 235/487, 488, 419

[56] References Cited

U.S. PATENT DOCUMENTS

| 3,971,916 | 7/1976 | Moreno | 235/487 |
| 4,001,550 | 1/1977 | Schatz | 235/487 |
| 4,007,355 | 2/1977 | Moreno | 235/487 |
| 4,092,524 | 5/1978 | Moreno | 235/487 |
| 4,102,493 | 7/1978 | Moreno | 235/419 |
| 4,105,156 | 8/1978 | Dethloff | 235/487 |
| 4,211,919 | 7/1980 | Ugon | 235/487 |

Primary Examiner—Harold I. Pitts
Attorney, Agent, or Firm—Kerkam, Stowell, Kondracki & Clarke

[57] ABSTRACT

A portable data or information carrier in the form of a card or the like. In order to maximize the confidentiality of information stored in the carrier, and more specifically to limit the amount of information available to a would-be defrauder monitoring data lines connecting the data carrier to external devices, the data carrier includes a microprocessor and an operatively associated protected memory to which access is protected. The memory includes at least one key or code which is compared to a key received from a device external to the data carrier to determine whether a particular operation is authorized. To ensure that the data carrier consumes the same amount of current whether the requested operation is authorized or unauthorized, the data carrier includes "access" and key "error" memory elements of the Electrically Alterable Read Only Memory (EAROM) type, and a bit is stored in the respective memory element in either event.

4 Claims, 3 Drawing Figures

DEVICE FOR THE PROTECTION OF ACCESS TO A PERMANENT MEMORY OF A PORTABLE DATA CARRIER

CROSS-REFERENCE TO RELATED APPLICATION

This is a continuation-in-part of commonly-assigned copending application Ser. No. 936,694, filed Aug. 25, 1978 by Michel Ugon, and entitled PORTABLE DATA CARRIER INCLUDING A MICROPROCESSOR, now U.S. Pat. No. 4,211,919, July 8, 1980, the entire disclosure of which is hereby incorporated by reference.

BACKGROUND AND BRIEF SUMMARY OF THE INVENTION

The present invention relates to an anit-theft device which is associable with the read and write elements of a microprocessor operatively associated with a protected memory such as is described in the above-referenced parent application Ser. No. 936,694, now U.S. Pat. No. 4,211,919, granted July 8,1980.

In the parent application there is described a portable data carrier for the storage and processing of data, characterized in that it comprises a microprocessor associated with at least one programmable read-only memory, the microprocessor comprising elements for reading from and writing in parts of the programmable read-only memory as well as elements for the reception or transmission of data to be written in or read from the programmable read-only memory. The data carrier is moreover characterized in that the read and write elements comprise first means for recognition of an enabling key associated, on the one hand, with second means for storing an error bit in one zone of the programmable read-only memory when the key is incorrect and, on the other hand, with third means for storing an access bit in another zone of the programmable read-only memory when the key is correct.

As described in the parent application, it is necessary in certain applications to protect access to a permanent memory PROM by an access key associated with certain rights of reading and writing in specific zones. The prior art is abundantly provided with devices enabling the dissuasion of would-be defrauders who make several attempts to discover the access key to a memory. Amongst these devices the best known, without a doubt, is one which permanently stores the key errors, and blocks operation when the number of errors exceeds a predetermined limit. However, this device is inefficient if it is utilized alone. In fact, the observation of the variations of writing current in the memory enables the accurate determination of the passage of a correct key, provided that this current is limited correctly so that the recording of errors cannot occur. In accordance with the invention as disclosed in the parent application, this problem is resolved by a symmetrical operation of the microprocessor, with auto-verification of the write operations.

More particularly, data is always written in the memory whether the access key is correct or incorrect. The data carrier thus consumes the same amount of current whether the requested operation is authorized or unauthorized, and the would-be defrauder cannot therefore be informed of the results of the actions he undertakes.

During a writing operation, the device as briefly described above is effective and efficient, since the memory is modified in any case. Symmetry is ensured by using an error bit or an associated bit in the word to be written.

During a read operation, if it is desired to protect access with a key, it is necessary first of all to write in a memory zone reserved for this purpose.

In this way all the accesses are stored at the level of an access memory, which is an advantage when it is a matter of limiting the number of protected read operations.

On the other hand, this operation is penalizing at the level of the memory since it requires a relatively large space in memory.

Furthermore, it is inapplicable when the access should be protected during reading for an indefinite time as long as the working memory is not full.

In accordance with the present invention, this problem is resolved by adding to the storage devices described in the parent application an access memory and an error memory, both of the electrically erasable read only memory type.

BRIEF DESCRIPTION OF THE DRAWINGS

While the novel features are set forth with particularity in the appended claims, the invention, both as to organization and content, will be better understood and appreciated with the aid of the following description given with reference to the drawings, in which:

DETAILED DESCRIPTION OF THE PREFERRED EMBODIMENT

Figure 1:
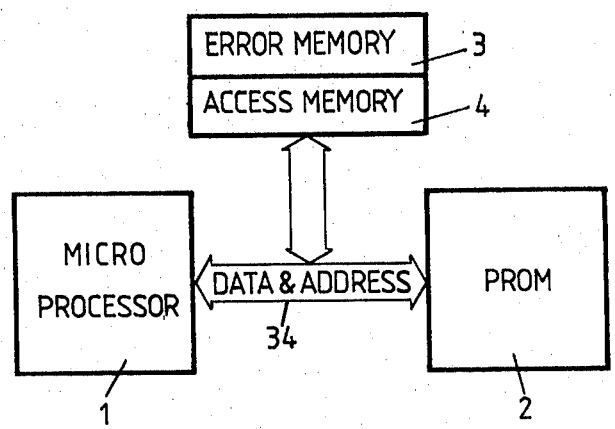
FIG. 1 is a block diagram of one embodiment of a portable data carrier device in accordance with the present invention.

In FIG. 1, a portable data carrier 5 shown comprises, in addition to the microprocessor 1 and the programmable read-only memory 2 of the above-referenced parent application, error and access memories 3 and 4. The error and access memories 3 and 4 can be of any size, but it is important that they are electrically erasable by exclusive action of the microprocessor 1.

This means that these memories 3 and 4 cannot be erased by devices external to the data carrier 5. This could be obtained by locking devices operated by programming which are, therefore, not part of the present invention.

It will be noted that memories 3 and 4 are directly connected to a data and address bus 34 connecting the microprocessor 1 to the memory PROM 2, this bus also being denoted by reference numeral 34 in FIG. 5 of the present application. For memories 3 and 4, memories of the Electrically Alterable Read Only Memory (EAROM) type may be employed. For more information on these memories, reference may be made to the book entitled "Les Microprocesseurs" by Rodnay Zaks and Pierre le Beux, edited by Sybex, 313, rue Lecourbe, 75015 Paris, pages 77 to 81.

Figure 2:
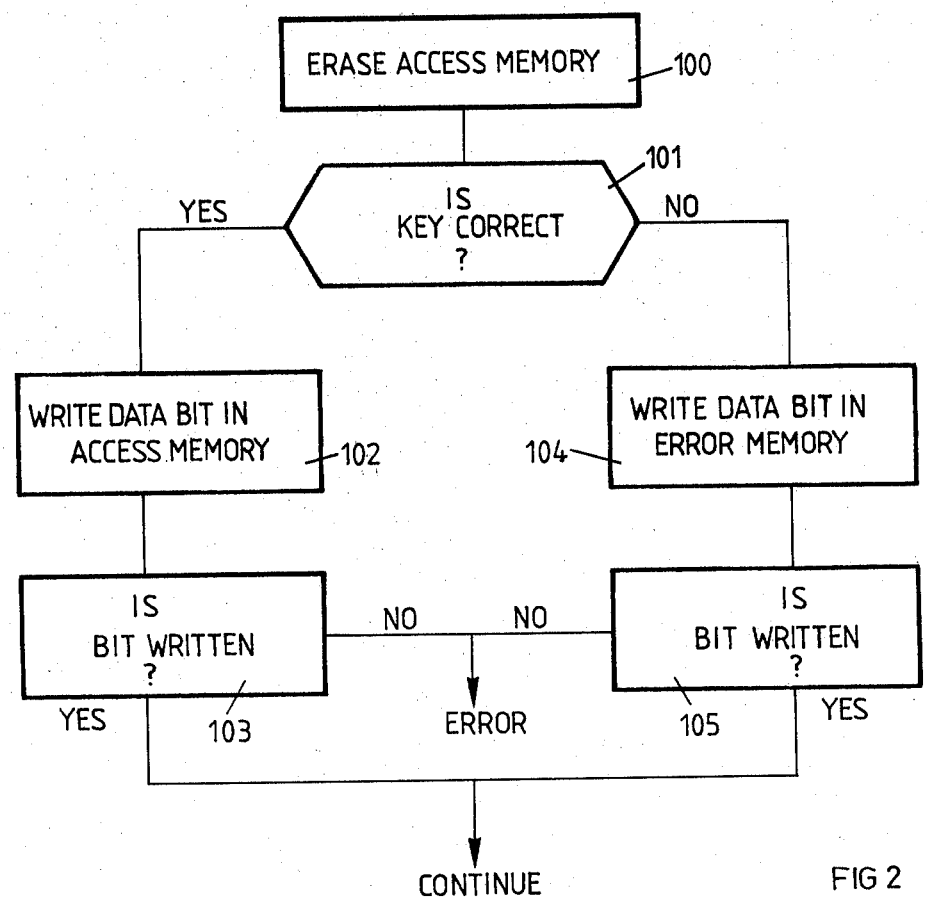
FIG. 2 is a flowchart showing steps for writing bits symmetrically.
Figure 3:
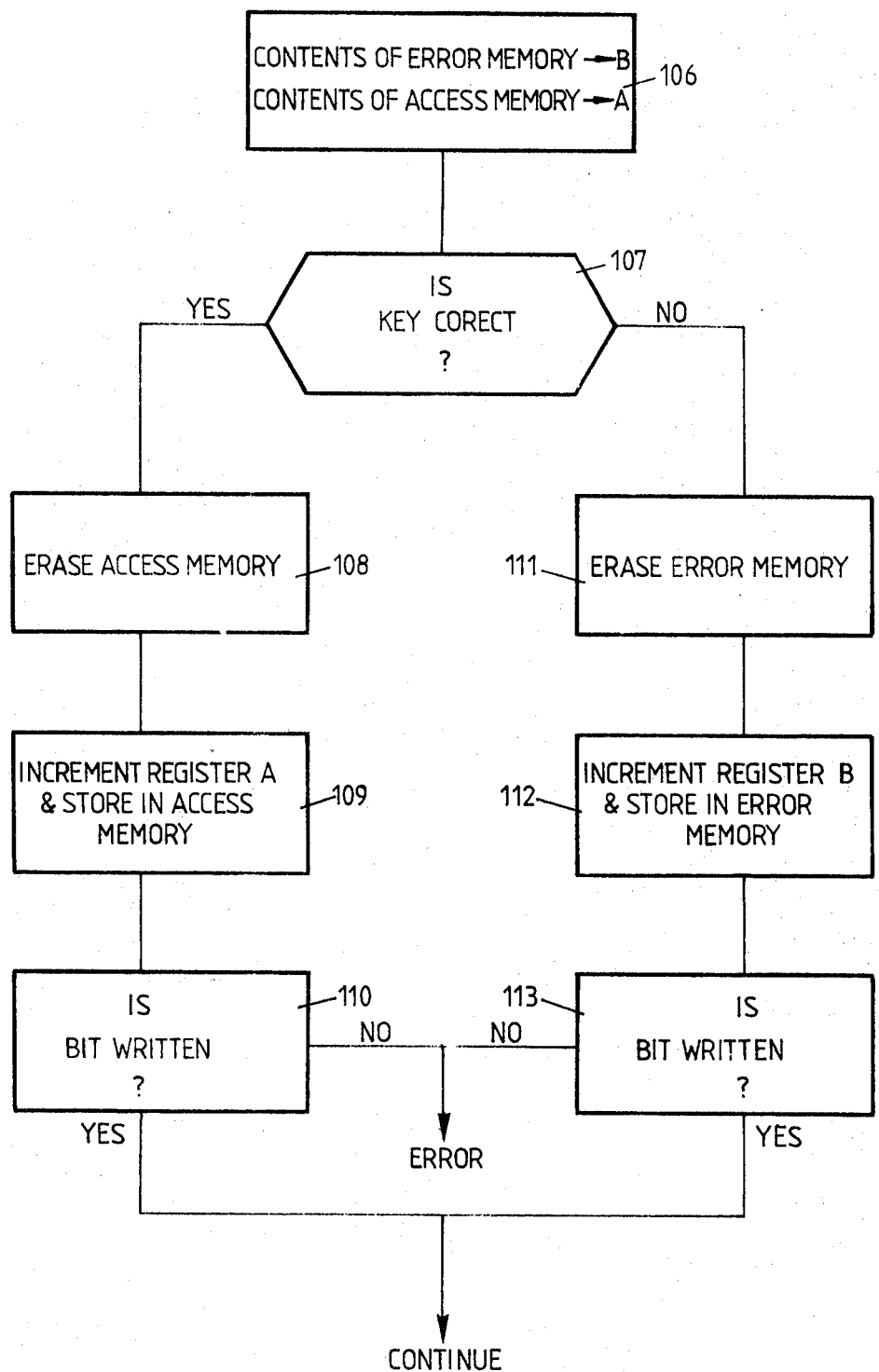
FIG. 3 is a flowchart showing steps for counting errors and accesses.

The operation of the data carrier 5 may take several different forms, each carried out with the aid of a program, specifically a microprogram, recorded in the control memory 20 illustrated in FIG. 5 of the parent application, exemplary microprograms being represented by the flowcharts of FIGS. 2 and 3 herein.

Referring to FIG. 2, at the start (Step 100), the access memory 4 is erased. At step 101, the microprocessor 1 tests whether the access requested is made with the correct key. If the key is correct, a data bit is written in the access memory 4 (Step 102). If, on the other hand, the key is not correct, a data bit is instead written in the error memory 3 (Step 104). Steps 103 and 105 are to verify whether a bit has, in fact, been written in one or the other of the memories 3 and 4; there is an error if no write operation has taken place.

This method of operation is characterized by the symmetry of actions carried out whether the key is correct or incorrect. In an important feature of the invention, preliminary erasure of the access memory 4 allows re-utilization of this area on each reading, without limit.

FIG. 3 is a variation in the usage of the error and access memories 3 and 4 in order to store accumulated counts of key errors, as well as of accesses. Step 106 at the start of operation comprises reading and storing the contents of the error and access memories 3 and 4 in the registers B and A of the microprocessor shown in FIG. 5 of the parent application. At step 107, the key is checked as to whether it is a correct key. If the key is correct, the access memory 4 is erased in Step 108. The access counter contained in register A is incremented by one unit and rewritten in access memory 4 at Step 109. If the key is incorrect, the error memory 3 is erased at Step 111. The error counter is incremented by one unit in register B and rewritten in the error memory 3 at Step 112. Steps 110 and 113 are to verify that the write operation has indeed taken place. In order to maintain symmetry of operation, it is desirable to use an n among m code for recoding of error and access counts before and after incrementation.

The example which has been given of a prefered embodiment of the invention is in no way intended to be limitative, and it is realized that those persons skilled in the art can devise other embodiments without departing from the scope of the invention.

What is claimed is:

1. A portable data carrier for storing and processing data, comprising:
   a microprocessor;
   a protected memory to which access is to be protected;
   an access memory element of the electrically alterable read only memory type and an error memory element of the electrically alterable read only memory type;
   said microprocessor including internal first elements for reading and writing in said protected memory, second elements for receiving external data to be written in said protected memory, and third elements for externally transmitting data read from said protected memory; and
   said internal first elements including means for checking an enabling key received from a device external to said carrier, means for storing an error bit in said error memory element when the enabling key is incorrect, and means for storing an access bit in said access memory element when the enabling key is correct.

2. A portable data carrier according to claim 1, wherein said means for storing an access bit in said access memory element areases said access memory prior to such storing.

3. A portable data carrier according to claim 2, wherein said means for storing an error bit in said error memory element erases said error memory prior to such storing.

4. A portable data carrier according to claim 1, wherein said internal first elements further include means for counting and storing in said access and error memory elements respective accumulated counts of accesses and access key errors.

* * * * *

UNITED STATES PATENT AND TRADEMARK OFFICE
CERTIFICATE OF CORRECTION

PATENT NO. : 4,295,041
DATED : October 13, 1981
INVENTOR(S) : Michel UGON

It is certified that error appears in the above-identified patent and that said Letters Patent are hereby corrected as shown below:

Column 4, line 28:

"areases" should be corrected to read "erases"

Signed and Sealed this

Nineteenth Day of January 1982

[SEAL]

Attest:

GERALD J. MOSSINGHOFF

Attesting Officer    Commissioner of Patents and Trademarks